United States Patent [19]

Wass

[11] 4,404,861
[45] Sep. 20, 1983

[54] LIQUID FLOWMETER
[75] Inventor: Colin Wass, Castleford, England
[73] Assignee: Brown Boveri Kent Limited, Bedfordshire, England
[21] Appl. No.: 285,640
[22] Filed: Jul. 22, 1981
[30] Foreign Application Priority Data Aug. 4, 1980 [GB] United Kingdom ............... 8025316

[51] Int. Cl.³ ............................................... G01F 1/12
[52] U.S. Cl. ............................. 73/861.83; 73/861.79; 73/861.89
[58] Field of Search ........... 73/861.79, 861.81, 861.82, 73/861.83, 861.89

[56] References Cited

U.S. PATENT DOCUMENTS 2,709,366  5/1955  Potter .
3,201,083  8/1965  Schaus .
3,248,945  5/1966  Karlby .
3,972,233  8/1976  Pelt .

FOREIGN PATENT DOCUMENTS 257972   11/1967  Austria ............................ 73/861.83
243274   2/1912   Fed. Rep. of Germany .
947834   8/1956   Fed. Rep. of Germany .
2713254  9/1978   Fed. Rep. of Germany .
733273   7/1955   United Kingdom .
1036484  7/1966   United Kingdom .

Primary Examiner—Howard A. Birmiel
Attorney, Agent, or Firm—Kirschstein, Kirschstein, Ottinger & Cobrin

[57] ABSTRACT

A flowmeter having a flow passageway with co-axial inlet and outlet openings at its opposite ends and a vaned flow measuring rotor between the openings. The rotor is mounted in low friction bearings and yet the meter is operable within the normal accuracy specification for a conventional high-friction meter as a result of the presence of a constriction in the passageway upstream of the rotor. The passageway and constriction are of circular cross section and the constriction has a main portion which opens directly at the downstream end near the rotor, and a tapering upstream portion connecting with the passageway. The constriction affects flow at the rotor at turbulent but not at laminar velocities.

6 Claims, 11 Drawing Figures

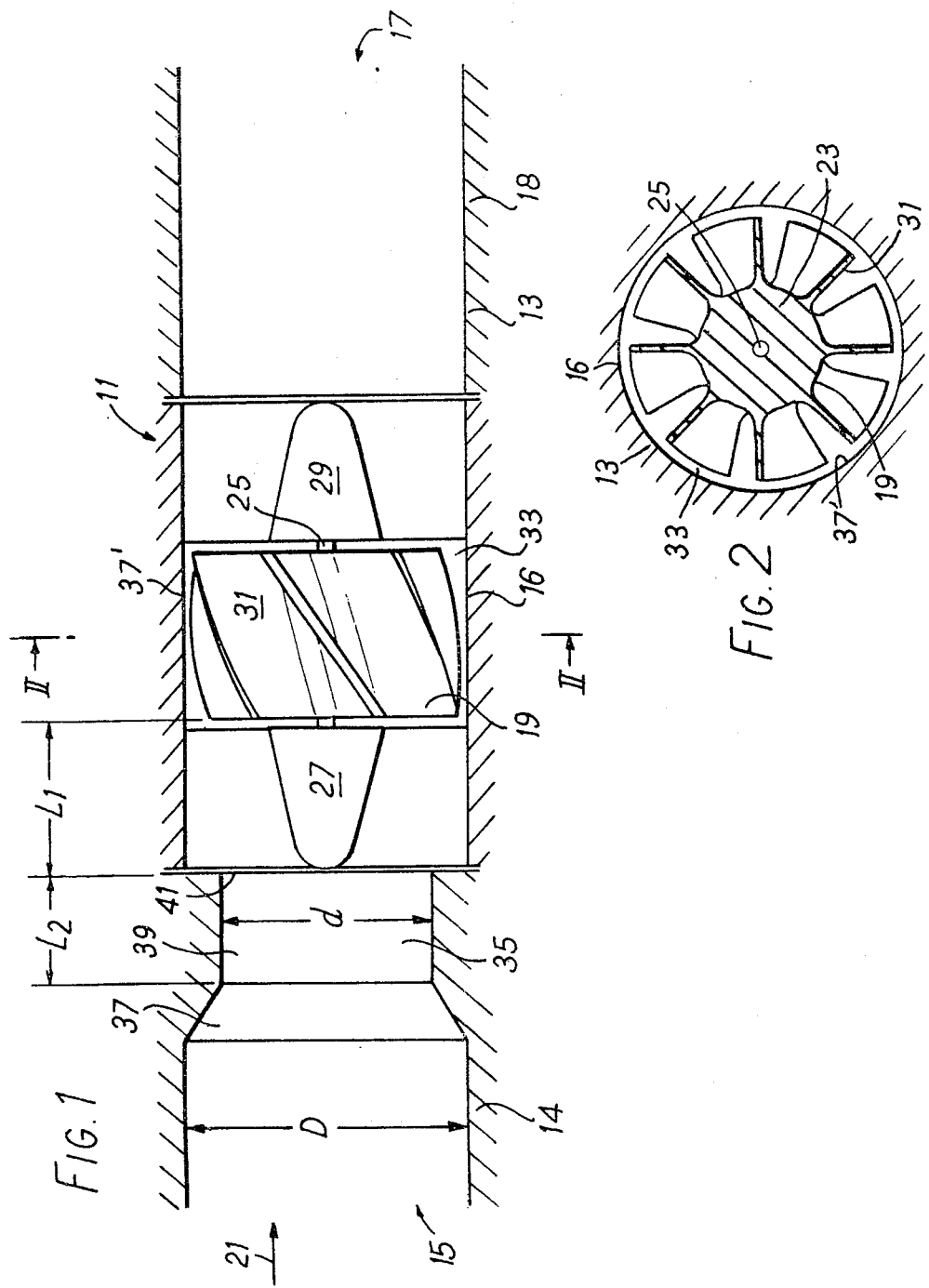

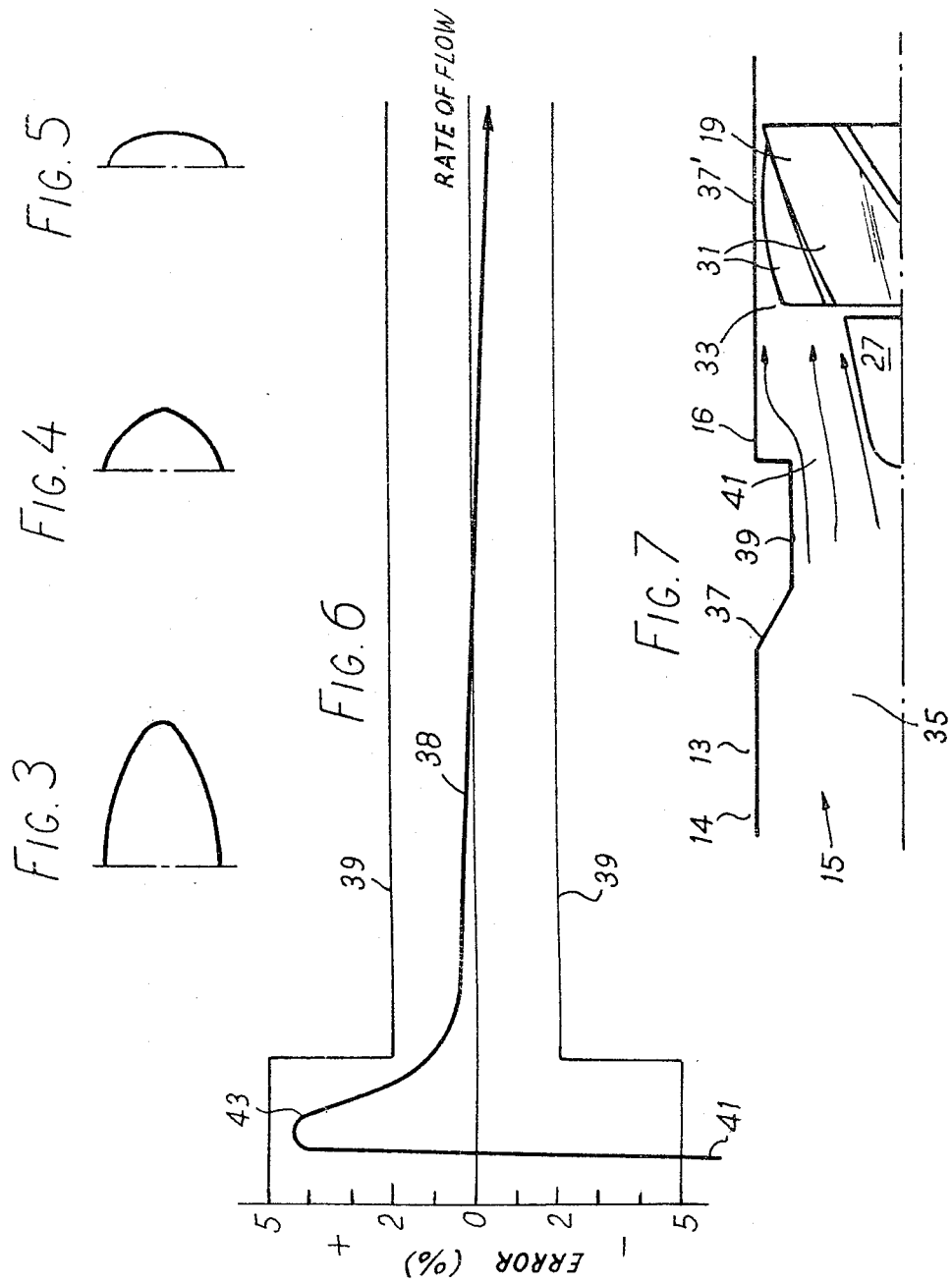

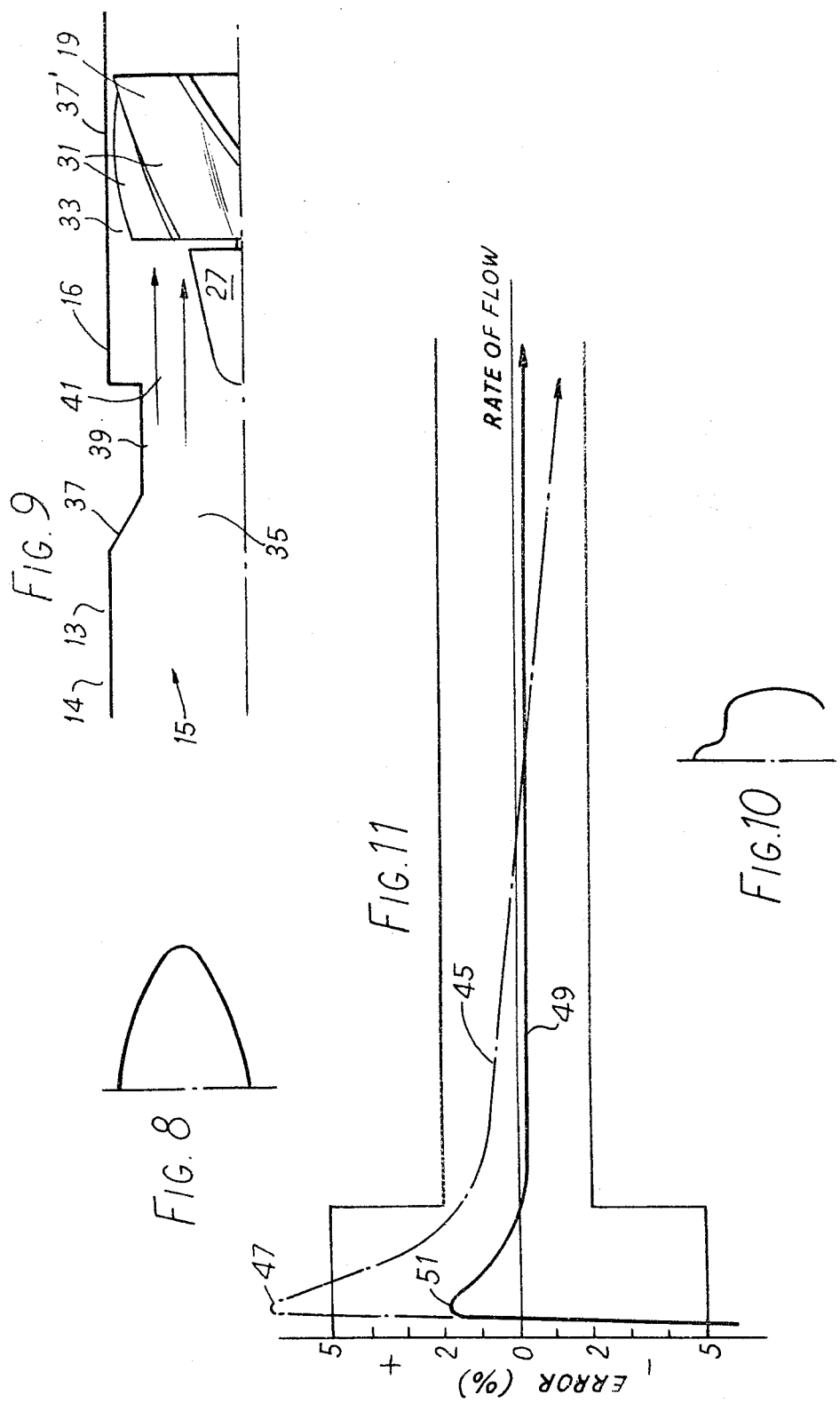

LIQUID FLOWMETER

The present invention relates to liquid flowmeters, and in particular to flowmeters having a flow passageway formed at respective opposite ends thereof with coaxial inlet and outlet openings and provided therebetween with a vaned flow measuring rotor disposed with its axis of rotation extending along the direction of flow. The vanes may be of helical form or alternatively planar and inclined at an angle to the direction of flow. Meters of the above type are known variously as helix, propellor, spiral, turbine, velocity or inferential-type meters and they may operate either mechanically or electromechanically to give a reading of flow-rate and/or of quantity of flow.

The operating accuracy of a meter at a specific flow rate can be determined by passing liquid for a given time into a calibrated vessel to determine the actual flow rate and comparing this with the meter reading. The measured flow rate minus the actual rate, expressed as a percentage of the actual flow rate gives the percentage error for one particular flow rate. The performance of the meter may be tested likewise over the whole range of operation, and an accuracy curve obtained by plotting graphically the percentage error against the flow rate. In order to minimise the error in meter readings, the meter is calibrated to reduce the difference between actual and observed readings over the range of operation and to bring the accuracy curve as far as possible within the specification for the meter.

The two main sources of error are, as is described in more detail hereinafter, friction which tends to reduce the rotor speed, especially at low flow rates, and the fact that at laminar flow velocities the liquid in the centre of the velocity profile is moving faster than the mean velocity, which has the effect of increasing the rotor speed. In prior art meters the combined effect of these errors is to cancel one another partially so that on appropriate calibration there is a peak in the error curve in the laminar flow region which lies within the normal accuracy specification of around a 5% error for such flow rates, and over the turbulent flow region the error is smaller and within a 2% accuracy specification. Nowadays, however, materials and designs are available which permit a substantial reduction in the effect of friction, although with known types of meter if low friction bearings were used the peak in the error curve in the laminar flow region would not fall within the above accuracy specification.

It is an object of the present invention to provide a liquid flowmeter of the above kind which has a rotor mounted in low friction bearings and which can be operated within the normal accuracy specification for a conventional high friction-level meter of the same type.

According to the present invention, there is provided a liquid flowmeter comprising a flow passageway formed at respective opposite ends thereof with coaxial inlet and outlet openings, a vaned flow measuring rotor mounted between the openings in low friction bearings and disposed with its axis of rotation extending along the direction of flow, and a constriction in the passageway upstream of the rotor, the flow passageway at opposite ends of the constriction being of uniform cross-section and the constriction comprising a main portion of uniform cross-section less than that of the passageway which at the downstream end thereof opens directly into the passageway in the vicinity of the rotor whilst the upstream end includes a portion which is of tapering form and connects the main portion of the constriction with the passageway, whereby the velocity profile across the passageway at the rotor arising at laminar flow rates is substantially unaffected by the presence of the constriction and the velocity profile across the passageway at the rotor arising at turbulent flow rates is altered by the presence of the constriction.

Suitably, the flow passageway and the constriction are of circular cross-section.

The invention will now be described, by way of example, with reference to the accompanying drawings in which:

FIG. 1 illustrates diagrammatically, in sectional side view, a liquid flowmeter according to the invention;

FIG. 2 is a sectional view taken along the line II—II of FIG. 1;

FIGS. 3 to 5 are velocity profiles for a flowmeter without a constriction;

FIG. 6 is an accuracy curve for a flowmeter without a constriction or low friction bearings;

FIG. 7 is a partial view of the meter as shown in FIG. 1 showing the flow pattern at laminar flow rates;

FIG. 8 is the velocity profile at the rotor across a portion of the passageway shown in FIG. 7 at laminar flow rates;

FIG. 9 is a partial view of the meter as shown in FIG. 1 showing the flow pattern at turbulent flow rates;

FIG. 10 is the velocity profile at the rotor across a portion of the passageway shown in FIG. 9 at turbulent flow rates; and FIG. 11 shows accuracy curves, one for the illustrated embodiment of meter and the other for a similar meter without a constriction.

Referring to the drawings, there is illustrated in FIGS. 1 and 2 a liquid flowmeter, generally indicated by the numeral 11, according to one embodiment of the invention. The meter has a flow passageway 13 of uniform circular cross-section and diameter D formed at respective opposite ends thereof with coaxial inlet and outlet openings 15, 17. The passageway is formed in three sections: an inlet section 14, a metering section 16 and an outlet section 18 fitted together coaxially. Provided within the passageway between the openings 15 and 17, in the metering section 16, is a helically vaned flow measuring rotor 19, disposed with its axis of rotation extending along the direction of flow, shown by an arrow 21, which is along the axis of the passageway.

Those skilled in the art will be familiar with the various forms of rotor which would be suitable for use in flowmeters of the kind described. The type illustrated comprises a solid cylindrical body 23 integral with a spindle 25 which is supported at respective opposite ends thereof in low-friction bearings (not shown). The bearings are located within housings 27, 29 of generally conical shape with the apices thereof remote from the rotor and lying on the axis of the passageway. One way of providing for low frictional forces between the spindle 25 and bearings would be to support the spindle, preferably formed of tungsten carbide, within polytetrafluoroethylene (PTFE)—compounded plastics sleeve bearings; alternatively, the spindle, again preferably tungsten carbide, could be held within synthetic jewel bearing pads. A plurality of helical vanes 31 extend along the length of the rotor body 23 and outwardly therefrom into annular channel 33 between the body 23 and the cylindrical wall 37' of the passageway 13. The angle of the conical housing 27 on the upstream side of the rotor is selected so that liquid enters the annular channel 33 at an appropriate angle to apply optimum driving torque to the helical vanes 31. Instead of extending helically, the vanes could be planar and inclined at a selected angle to the axis of rotation.

A constriction 35 of circular cross-section is present in the passageway upstream of the rotor at the end of the inlet section 14 of passageway remote from the inlet opening 15, and comprises a main portion 39 of uniform diameter d less than the diameter D of the passageway. At the downstream end 41 of the constriction the portion 39 opens directly into the passageway in the vicinity of the rotor 19, at a distance approximately D/2 from the rotor body 23. The constriction 35 further comprises an upstream portion 37 which is of frusto-conical tapering form inclined at an angle of approximately 30° to the direction of flow and connects the main portion 39 of the constriction with the passageway.

Liquid to be metered enters the flowmeter at inlet 15 and flows through the constriction 35 towards the rotor. In the annular channel 33 the liquid impinges on the rotor vanes, turning the rotor in its low friction bearings and generating a reading by known means, either mechanical or electro-mechanical, the magnitude of the reading depending on the velocity of the liquid. The rotor speed is basically proportional to the mean velocity of the liquid but since the velocity profile across the passageway at the rotor is never completely uniform, the faster flow particles have the greatest effect with the consequence that readings are higher than if all liquid travelled at the mean velocity. If the shape of the velocity profile were the same over the full range of flow rates over which the meter operates then clearly this effect could be cancelled by appropriate calibration. However, the shape of the profile does vary according to the type of flow.

Three velocity profiles across the annular channel 33 of a flow-meter of the type illustrated in FIGS. 1 and 2, but without a constriction 35, are illustrated in FIGS. 3, 4 and 5 which show profiles at laminar, transitional from laminar to turbulent and turbulent flow rates, respectively. It can be seen that at laminar flow rates, liquid in the centre of the channel between the rotor body 31 and the wall 37' of the passageway is moving at a velocity substantially greater than the mean velocity. In the transitional region, between laminar and turbulent rates, the difference between maximum and mean velocity is smaller, and at turbulent flow rates, the maximum velocity is close to the mean. In consequence, the error in meter readings caused by the above described effect of the faster liquid particles is greater in the laminar flow region and smaller at turbulent flow rates.

Whilst this effect causes unduly high meter readings particularly at low flow rates, there is another factor which has an opposing effect, tending to reduce the rate of rotation of the rotor and lower the meter readings, and this is friction acting on the rotor bearings, and also friction between gear wheels, if any, in the metering device.

In the flowmeter according to the invention, low frictional bearings and gears are used, but in most conventional meters the contribution from friction is quite large. Attention is now directed to FIG. 6 which shows an accuracy curve for a flowmeter similar to the one illustrated in FIGS. 1 and 2, but without a constriction 35 or low friction bearings. The meter has been suitably calibrated to bring the curve 38 within the limits of the accuracy specification indicated at 39, and the graph shows how the combined error in meter readings from the two sources varies with the flow rate. The forces of friction opposing rotation of the rotor are independent of the flow-rate and consequently there is a large negative percentage error 41 at low flow rates. At laminar flow rates the positive velocity effect is large, and, apart from at very low flow rates, this effect dominates in the laminar region although there is partial cancellation of errors. At higher flow rates, both types of error are smaller and there is almost complete cancellation, and thus the curve is as shown in the Figure, with a positive maximum 43 falling within the accuracy specification in this laminar range of 5%, and with the curve at higher rates within a 2% specification.

Turning now to FIGS. 7 to 10, flow patterns and velocity profiles are shown for the embodiment of the meter according to the invention illustrated in FIGS. 1 and 2. FIG. 7 illustrates the flow pattern of liquid moving at a laminar flow rate as it passes through the main portion 39 of the constriction, passes through the end 41 and over the conical housing 27 in moving towards the rotor 19, and FIG. 8 shows the velocity profile across the annular channel 33. It can be seen that this is the same kind of profile as the laminar flow profile shown in FIG. 3, since the profile is substantially unaffected by the constriction 35. FIG. 9 shows the flow pattern for liquid at a higher velocity and in this case, as can be seen in FIG. 10, the velocity profile is altered by the presence of the constriction. There is a "jetting" effect which gives an uneven velocity profile and increases the rotor speed for a given mean flow rate. This has the effect of increasing the previously small percentage positive error of readings at higher flow rates whilst leaving the larger percentage positive error at laminar flow rates unaffected.

Accuracy curves for meters with and without constrictions, but having low friction bearings and gears are shown in FIG. 11. A curve 45 for the meter without a constriction is shown in broken lines. The reduced effect of friction (compared with the meter giving the curve in FIG. 6) gives improved accuracy at very low rates of flow, but the positive maximum percentage error 47 in the laminar region is above 5% and does not fall within the accuracy specification, and there is quite a large negative slope to the curve at higher velocities. The curve 49 shown in unbroken lines is the accuracy curve for the embodiment of the invention shown in FIGS. 1, 2 and 7 and 9, and this curve also has good accuracy at low flow rates because of the smaller negative contribution to the error from friction, but the maximum positive error 51 falls well within the 5% specification and for the higher rates of flow the error is very small. Thus at laminar flow rates the velocity profile across the passageway at the rotor is substantially unaffected by the presence of the constriction, but at turbulent flow rates the constriction alters the velocity profile at the rotor, increasing the speed of the rotation. To improve the accuracy of the meter, the extent to which the speed of the rotor is increased is selected to reduce the difference between percentage meter error at turbulent flow rates and the maximum positive percentage meter error at laminar flow rates, that is, the maximum on the accuracy curve in the laminar region. The exact level of the curve in relation to the ordinate (error axis) is selected by calibration, for example by adjusting gear ratios, to minimise errors over the range of flow velocities measured by the meter.

The location and configuration of the constriction can be selected so that the difference between the percentage meter error at turbulent flow rates and the maximum positive meter error 51 in the laminar region is as small as possible for a given design of meter, to provide a meter which will fulfil stringent accuracy requirements. The curve 49 shown in FIG. 11, for example, would fall within an accuracy specification of 2% error in the main laminar region, and ±0.5% error in the turbulent region.

A suitable form of constriction concomitant with good accuracy is shown in the Figures, although this may be varied without any great sacrifice of accuracy: for example the slope of the frusto-conical inlet portion 37 can be increased or decreased.

For the form of constriction illustrated, it is preferred that the ratio of the diameter d of the main portion of the constriction to the diameter D of the passageway is in the range 0.7 to 0.9. Also, with this type of constriction, the ratio of the distance $L_1$ between the downstream end 41 of the constriction and the body of the rotor 19, to the diameter D of the passageway, is advantageously in the range 0.5 to 1.0, and the length $L_2$ of the main portion 39 of the constriction is suitably within the range 0.2 to 0.8 D.

The metering portion 16 of the passageway containing the rotor and the rotor bearings may be integral with the inlet and outlet portions 14 and 18, but is normally a separate fitting which is inserted between passageway portions of suitable dimension to form a meter as illustrated in FIG. 1. Likewise, the constriction 35 can be integral with the passageway or the inlet portion 14 thereof, or formed as a separate fitting.

I claim:

1. A liquid flowmeter comprising a flow passageway having coaxially disposed inlet and outlet ends, a freely rotatable vaned flow measuring rotor within the passageway and disposed with its axis of rotation extending along the direction of flow and a constriction in the passageway upstream of the rotor, the remainder of the passageway being of uniform cross-section and the constriction comprising a main portion of uniform cross-section less than that of the passageway which at the downstream end thereof opens directly into the passageway in the vicinity of the rotor and a portion at the upstream end which is of tapering form and connects the main portion of the constriction with the passageway, whereby the velocity profile across the passageway at the rotor arising at laminar flow rates is substantially unaffected by the presence of the constriction and the velocity profile across the passageway at the rotor arising at turbulent flow rates is altered by the presence of the constriction.

2. A liquid flowmeter as claimed in claim 1, wherein the passageway and the constriction are of circular cross-section.

3. A liquid flowmeter as claimed in claim 2, wherein the portion at the upstream end of the constriction is inclined at an angle of about 30° to the direction of flow.

4. A liquid flowmeter as claimed in claim 2, wherein the ratio of the diameter of the main portion of the constriction to the diameter of the passageway is in the range 0.7 to 0.9.

5. A liquid flowmeter as claimed in claim 2 wherein the ratio of the distance between the downstream end of the constriction and the rotor, to the diameter of the passageway is in the range 0.5 to 1.

6. A liquid flowmeter as claimed in claim 2, wherein the ratio of the length of the main portion of the constriction to the diameter of the passageway is in the range of 0.2 to 0.8.

* * * * *